United States Patent

Walther

[15] 3,642,327
[45] Feb. 15, 1972

[54] BEARING SEALS

[72] Inventor: William D. Walther, Dayton, Ohio
[73] Assignee: The Dayton Steel Foundry Company, Dayton, Ohio
[22] Filed: Nov. 20, 1969
[21] Appl. No.: 878,327

[52] U.S. Cl. ..................................301/108 R, 308/187
[51] Int. Cl. ...............................................B60b 27/00
[58] Field of Search ............301/108 R, 108 A; 308/187, 308/187.1; 215/11

[56] References Cited

UNITED STATES PATENTS

| | | | |
|---|---|---|---|
| 2,819,929 | 1/1958 | Hunt | 301/108 |
| 3,077,948 | 2/1963 | Law | 301/108 X |
| 3,134,494 | 5/1964 | Quinn | 215/11 |
| 3,149,883 | 9/1964 | Reilly | 301/108 A |
| 3,169,809 | 2/1965 | Pendleton | 301/108 R |

*Primary Examiner*—Richard J. Johnson
*Attorney*—Marechal, Biebel, French and Bugg

[57] ABSTRACT

A boat trailer wheel hub is provided with a flexible diaphragm which encloses the exposed end of the spindle and which has a peripheral portion in sealing engagement with the open end of the hub. When the boat trailer hub is subjected to a sudden temperature change, such as sudden cooling by being backed into water, the diaphragm prevents water from being drawn into the hub. In one embodiment, the diaphragm is carried as a part of the hubcap and in another embodiment it is retained separate from the hubcap.

1 Claim, 5 Drawing Figures

PATENTED FEB 15 1972 3,642,327

INVENTOR
WILLIAM D. WALTHER
BY
Marechal, Biebel, French & Bugg
ATTORNEYS

BEARING SEALS

BACKGROUND OF THE INVENTION

The bearings in boat trailer wheels and the like are subjected to severe environmental conditions of useage. A boat may be carried on such a trailer at high highway speeds and the hub may reach relatively high temperatures, in the order of 200° F. The hub is thus subjected to sudden cooling when the trailer is backed into water for the purpose of discharging the boat. Obviously, any air within the hub is subject to rapid contraction, with the result that water will be ingested into the interior of the hub.

The problem is particularly severe in cases where the boat trailer is used in salt water, but it is a problem even where the trailer is used in fresh water, particularly where the trailer is permitted to stand for an extended period of time after the water has been ingested into the hub. This often occurs where the boat and trailer are stored over the winter months, and it is not uncommon to find that the bearings are badly corroded or even "frozen" after an extended period of storage.

SUMMARY OF THE INVENTION

The present invention provides a simple and yet effective means of eliminating the ingestion of water or other foreign material into the interior of the hub due to sudden temperature changes, such as occurs by the submersion of the hub into water, by the provision of an elastic or deformable diaphragm which completely closes one open end of the hub and which is mounted in sealing relation to the hub. In the preferred embodiments, the diaphragm is positioned within or underneath the hubcap and encloses the outboard end of the spindle. At the occurrence of sudden chilling of the hub and contraction of the gases therein, the diaphragm is provided with sufficient clearance with respect to the spindle so that it may effectively contract or be collapsed by the differential pressure, without rupture and without admitting water into the bearing cavities.

It is accordingly an object of the present invention to provide an improved seal for a wheel hub to prevent the ingestion of water and the like.

Another object of this invention is to provide an improved hub assembly for boat trailers for preventing the ingestion of water when the boat trailer hub is subjected to sudden cooling.

A further object of this invention is the provision of an improved hubcap assembly for boat trailer wheels and the like incorporating an elastomeric seal and diaphragm for preventing a pressure differential between the inside and the outside of the hub when the same is submerged in water during loading and unloading of the boat.

These and other objects and advantages of the present invention will become apparent from the following description, the accompanying drawings and the appended claims.

DESCRIPTION OF PREFERRED EMBODIMENTS

Figure 1:
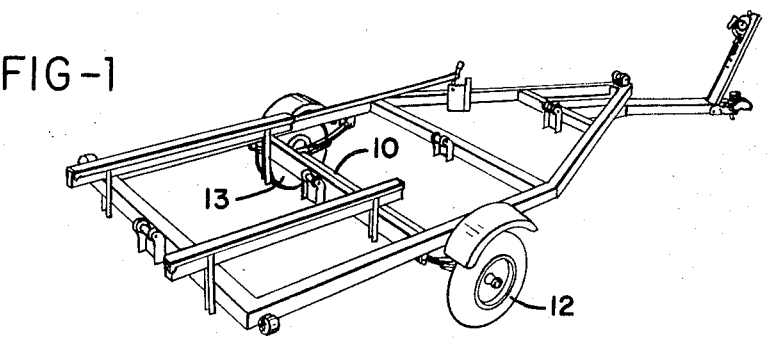
FIG. 1 is a perspective view of a typical boat trailer to which the present invention may be applied.

A typical boat trailer is shown in FIG. 1 as incorporating a dead unsprung axle tube 10 supporting spindles at the opposite ends for rotatably mounting ground engaging wheels 12 and 13. Such a boat trailer may be provided with either electric or hydraulically actuated brakes (not shown).

Figure 2:
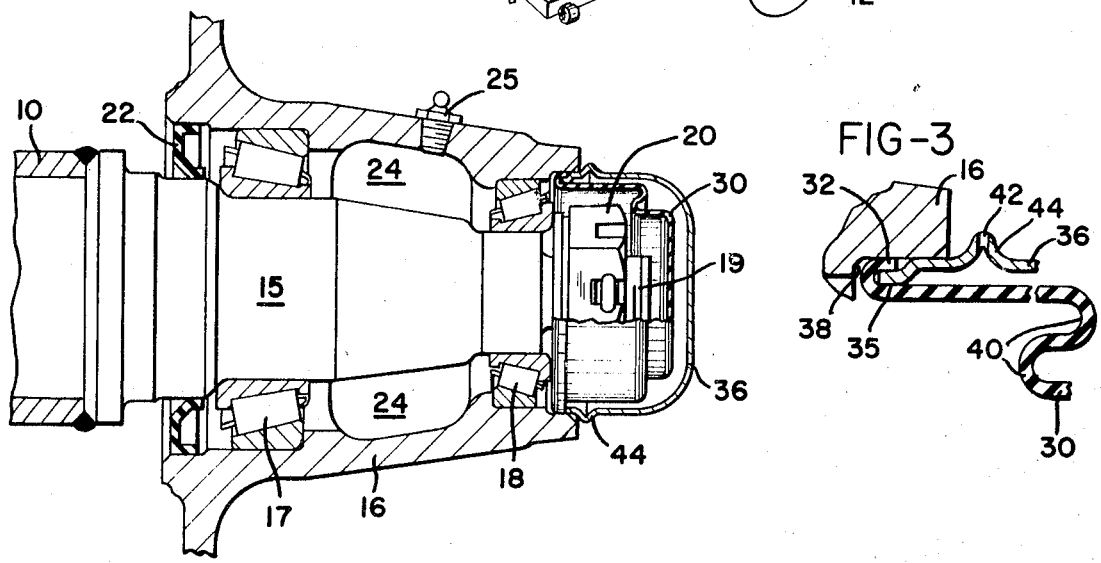
FIG. 2 is a vertical section through a wheel hub incorporating one form of the present invention.

Referring to FIG. 2, the spindle 15 is conventionally supported in the axle tube 10, and conventionally rotatably supports a hub 16 on a pair of tapered roller bearings 17 and 18. The outer or exposed end of the spindle 15 is threaded at 19 to receive the hub and bearing retainer nut 20. Further, according to conventional practice, the hub is provided with a rear seal 22 and is formed with an inner annular space 24 axially between the spindle bearings 17 and 18 within which a suitable lubricant may be received. Further, a fitting 25 may be provided in the hub 16 by means of which lubricant can be added to the hub.

In normal use, the space within the hub is normally only partially filled with grease. The rear seal 22 as well as the conventional hubcap, prevents loss of grease from the hub, and normally are sufficient protection for vehicles and trailers which are not subjected to sudden temperature changes such as occurs when the same is submerged in water.

However, as has been previously outlined, the conventional hub construction provides insufficient protection for boat trailer hubs and the like. In fact, the problem is particularly acute on boat trailers which are provided with braking apparatus at the wheels, as in these cases it is not uncommon for the brakes to reach a temperature of 200° F. or more. However, in the absence of brake structure, the hub temperature may still rise to well over 100° F. due to friction, to tire heat, and to ambient temperatures above the surface of the road.

The present invention provides a diaphragm 30 which is received over one open end of the hub, preferably in enclosing relation to the threaded end 19 of the spindle 15, and has its peripheral end 32 (FIG. 3) received in sealing relation to the hub. In this embodiment, the end 33 is folded back over the somewhat inwardly offset end 35 of a metal hubcap 36 and in this manner may be assembled, along with the hubcap, onto the hub by pressing the combined seal and hubcap into the conventional inwardly facing recess 38 at the open end of the hub 16.

The diaphragm 30 may be formed with one or more convolutions 40, and is positioned in the space between the hubcap 36 and the spindle end 19, in noncontacting relation to the spindle and to the nut 20. In effect, the diaphragm 30 defines a movable wall member within the hubcap which is responsive to changes in volume of the gases and other materials within the hub 16 so as to prevent a pressure differential from being formed by reason of sudden cooling of the hub. When the hot hub 16 is submerged in the water by the backing of the trailer into the water to discharge a boat thereon, the diaphragm simply collapses temporarily about the spindle end 19 and nut 20, thus maintaining a substantial pressure equalization while preventing the intrusion of water into the interior of the hub 18. Further, since the pressure equalization is maintained by the diaphragm 30, there is little likelihood of water being forced into the hub through the rear seal 22. After the trailer is withdrawn from the water, the hub may again achieve normal ambient temperature and the diaphragm 30 will be displayed to its original position.

The metallic hub cap 36 provides a backup protection for the diaphragm 30. In the case of extreme heat of the hub, the diaphragm 30 may expand outwardly to the point where it is restrained by the adjacent inner surface of the hubcap 36, thus preventing rupture of the diaphragm. Further, the hubcap 36 provides protection against damage to the diaphragm 30 by reason of external road hazards.

The diaphragm 30 may be formed entirely of any suitable elastomeric material, preferably one which is relatively unaffected by oils and greases, such as Neoprene. It is, however, within the scope of the invention to form the diaphragm as an integral part of the hubcap 36, the only requirement being that a reasonably watertight seal be formed between the periphery of the hubcap and the hub, and that a movable wall member be provided for pressure equalization. Accordingly, the hubcap 36 with the diaphragm 30 may conventionally be employed as a replacement item for the conventional hubcaps now in common useage.

It is preferably that one or more vent openings 42 be provided in the hub 36 so as to prevent the air which may be entrapped between the cap and the outer surface of the diaphragm 30, from impeding the proper operation of the diaphragm. To this end, one or more small openings 42 may be formed preferably in the annular rib portion 44 of the hubcap outwardly of the hub. If water should be drawn in openings 42 it will be prevented from entering the hub by the diaphragm 30, and will be discharged either by gravitational drainage, or centrifugal force when the trailer is again moved.

Figure 4:
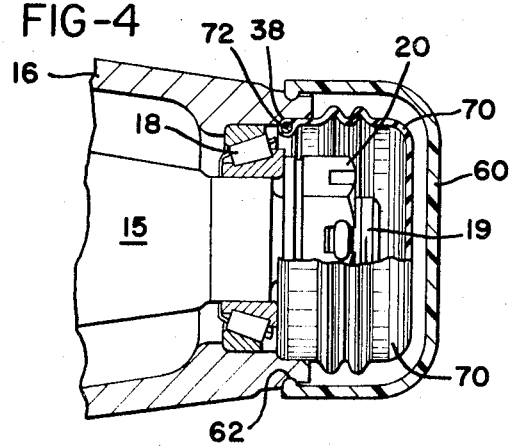
FIG. 4 is a fragmentary vertical section of a modified form of the invention.

Referring to FIG. 4, in which like reference numerals represent like parts, a modified form of the invention is shown for use with a plastic hubcap 60. In this embodiment, a diaphragm 70 is formed separately from the hubcap 60 and are supported and received on separate portions of the hub 16. Thus, the plastic hubcap 60 is received over an outer surface of the exposed end of the hub 16 within a suitable groove 62. The diaphragm 70, on the other hand, is formed with an embedded retaining wire 72 molded therein along its peripheral portion. The wire 72 forms a stiffener and retains the axial inner end of the diaphragm 70 within the hub recess 38. In all other respects the diaphragm 70 operates in the same manner as that of the diaphragm 30 to protect the hub and the enclosed bearings against the intrusion of water.

Figure 3:
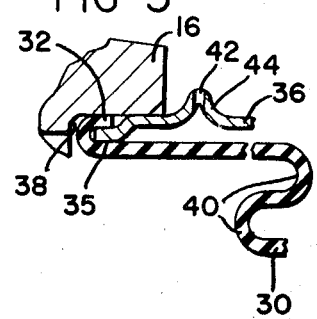
FIG. 3 is an enlarged vertical fragmentary section through the diaphragm and metal hubcap.

It may be desired to incorporate pressure equalizing openings within the plastic cap 60 corresponding in function to the openings 42 of FIG. 3, if desired. However, since the plastic cap 60 is not sealed to the hub, as is the cap 36, and sufficient pressure equalizing air may flow into the interior of the cap 60 without the necessity of providing breather openings.

Figure 5:
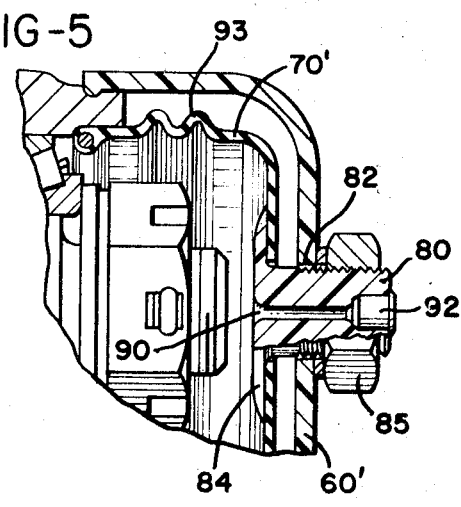
FIG. 5 is an enlarged fragmentary section, showing a modification of the embodiment of FIG. 4.

Some wheel hubs now have bearings which are designed to be lubricated with oil instead of grease. The embodiment of FIG. 5 shows a preferred arrangement for applying lubricating oil through the diaphragm while it is in place. To this end the diaphragm 70' has a nipple 80 bonded thereto and extending axially through an opening 82 formed in the cap 60'. The nipple 80 may be formed of molded plastic material with an enlarged inner end 84 received on an inside surface of the diaphragm 70'.

The body of the nipple 80 is threaded to receive a nut 85 exteriorly of the cap 60' to support the nipple 80 in a fixed relation to the cap 60'. The nipple 80 has an axially oil passageway 90 leading into the interior of the diaphragm through which lubricating oil may be applied to the hub interior. The outer end of the passageway 90 is normally closed by a stopper 92.

The operation of the embodiment of FIG. 5 is essentially the same as that of the preceding embodiments. There is provided a sufficient extent of diaphragm material in the convolutions 93 to permit the collapsing movement with sudden cooling of the axle as previously described.

While the forms of apparatus herein described constitute preferred embodiments of the invention, it is to be understood that the invention is not limited to these precise forms of apparatus, and that changes may be made therein without departing from the scope of this invention.

What is claimed is:

1. An improved wheel hub and bearing assembly for boat trailers and like vehicles in which a hub has an open end and is rotatably mounted on a spindle exposed through said open end, and in which said hub is subject to rapid temperature changes such as by being submerged in water during the unloading or loading of a boat thereon, comprising a movable diaphragm enclosing said hub open end and said spindle, said diaphragm having a wall portion movable with respect to said hub to accommodate expansions and contractions of gases and the like contained within said hub by reason of said temperature changes, a hubcap on said hub received over said diaphragm, and said diaphragm being formed of molded flexible elastomeric material and having a peripheral portion retained on said hub open end by said hubcap and forming a peripheral seal with said hub.

* * * * *